No. 704,876. Patented July 15, 1902.
W. P. HARRIS.
MACHINE FOR REMOVING STONES FROM CHERRIES OR OTHER SINGLE STONED FRUIT.
(Application filed Feb. 24, 1902.)
(No Model.) 4 Sheets—Sheet 1.

Witnesses:

Inventor
William P. Harris
By James L. Norris
Atty

No. 704,876. Patented July 15, 1902.
W. P. HARRIS.
MACHINE FOR REMOVING STONES FROM CHERRIES OR OTHER SINGLE STONED FRUIT.
(Application filed Feb. 24, 1902.)

(No Model.) 4 Sheets—Sheet 3.

Witnesses

Inventor
William P. Harris
By James L. Norris
Atty

No. 704,876. Patented July 15, 1902.
W. P. HARRIS.
MACHINE FOR REMOVING STONES FROM CHERRIES OR OTHER SINGLE STONED FRUIT.
(Application filed Feb. 24, 1902.)
(No Model.) 4 Sheets—Sheet 4.

Witnesses: Inventor
William P. Harris
By James L. Norris
Atty

UNITED STATES PATENT OFFICE.

WILLIAM PERCY HARRIS, OF LONDON, ENGLAND, ASSIGNOR TO THE FRUIT STONING AND PRESERVING SYNDICATE, LIMITED, OF LONDON, ENGLAND.

MACHINE FOR REMOVING STONES FROM CHERRIES OR OTHER SINGLE-STONED FRUIT.

SPECIFICATION forming part of Letters Patent No. 704,876, dated July 15, 1902.

Application filed February 24, 1902. Serial No. 95,280. (No model.)

*To all whom it may concern:*

Be it known that I, WILLIAM PERCY HARRIS, a subject of the King of Great Britain, residing at London, England, have invented new and useful Improvements in Machines for Removing the Stones from Cherries or other Single-Stoned Fruit, of which the following is a specification.

This invention consists in the improvements hereinafter described in machines for removing the stones from cherries and other single-stoned fruit, the main object of the said improvements being to provide for extraction of the stone through an aperture in one side of and extending only partially into the fruit.

A machine embodying the improvements constituting the said invention comprises the following parts, namely: a hopper for containing a supply of the fruit to be dealt with, a carrier for conducting the fruit from the hopper to the part of the machine at which the removal of the stones is effected and there holding a number of the fruit stationary during the stoning operation, reciprocatory stone-extractors mounted at the said part, each of which extractors pierces and enters one of the fruit and engages with and withdraws the stone, means (hereinafter termed the "fruit-retainer") for holding the fruit while the extractors are retiring therefrom during withdrawal of the stones by them, means (hereinafter termed the "extractor-clearer") for disengaging the withdrawn stones from the extractors, means (hereinafter termed the "stone-discharger") for discharging the withdrawn stones from the machine after they have been disengaged from the extractors.

Such a machine is illustrated in the accompanying drawings.

Figure 1:
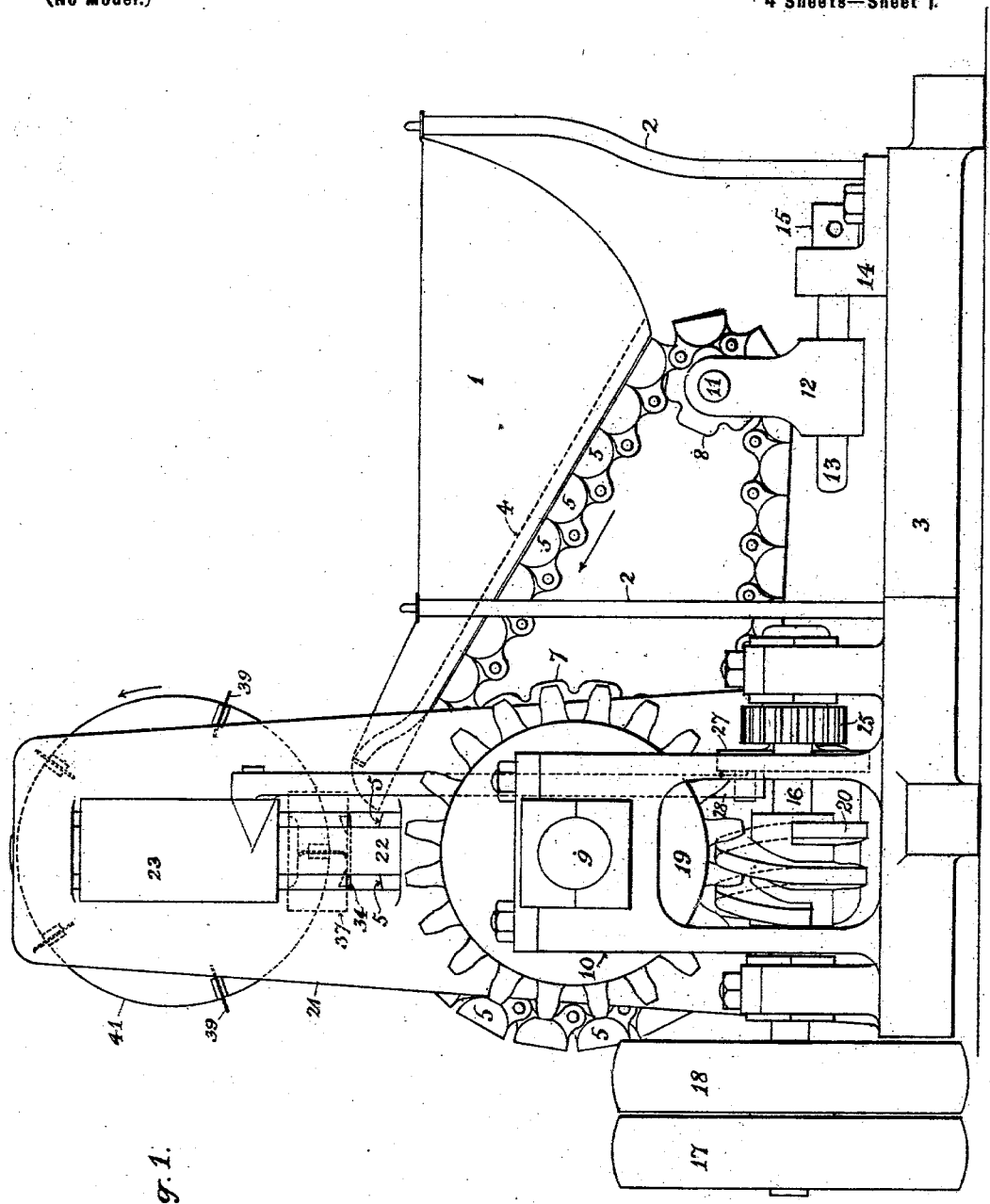
Figure 2:
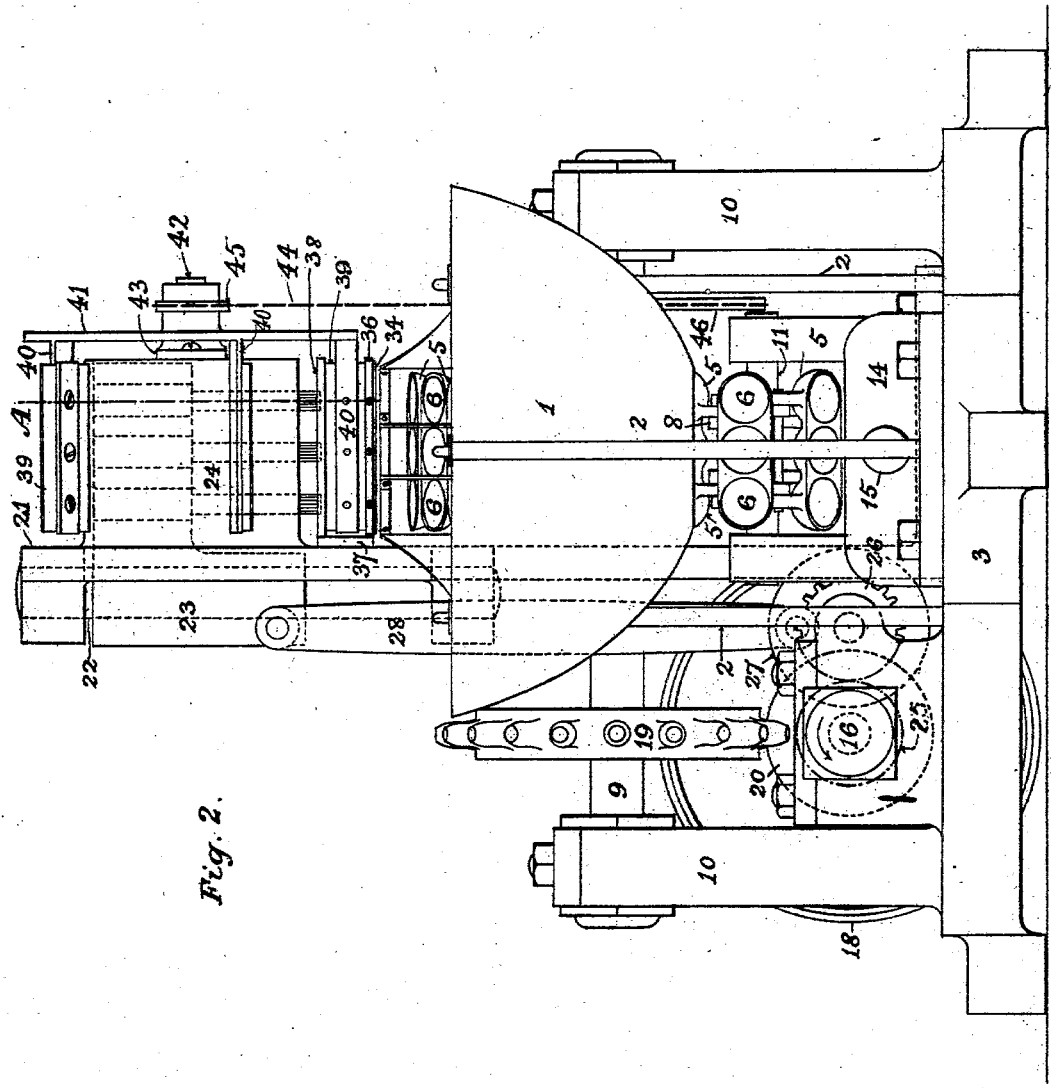
Figure 3:
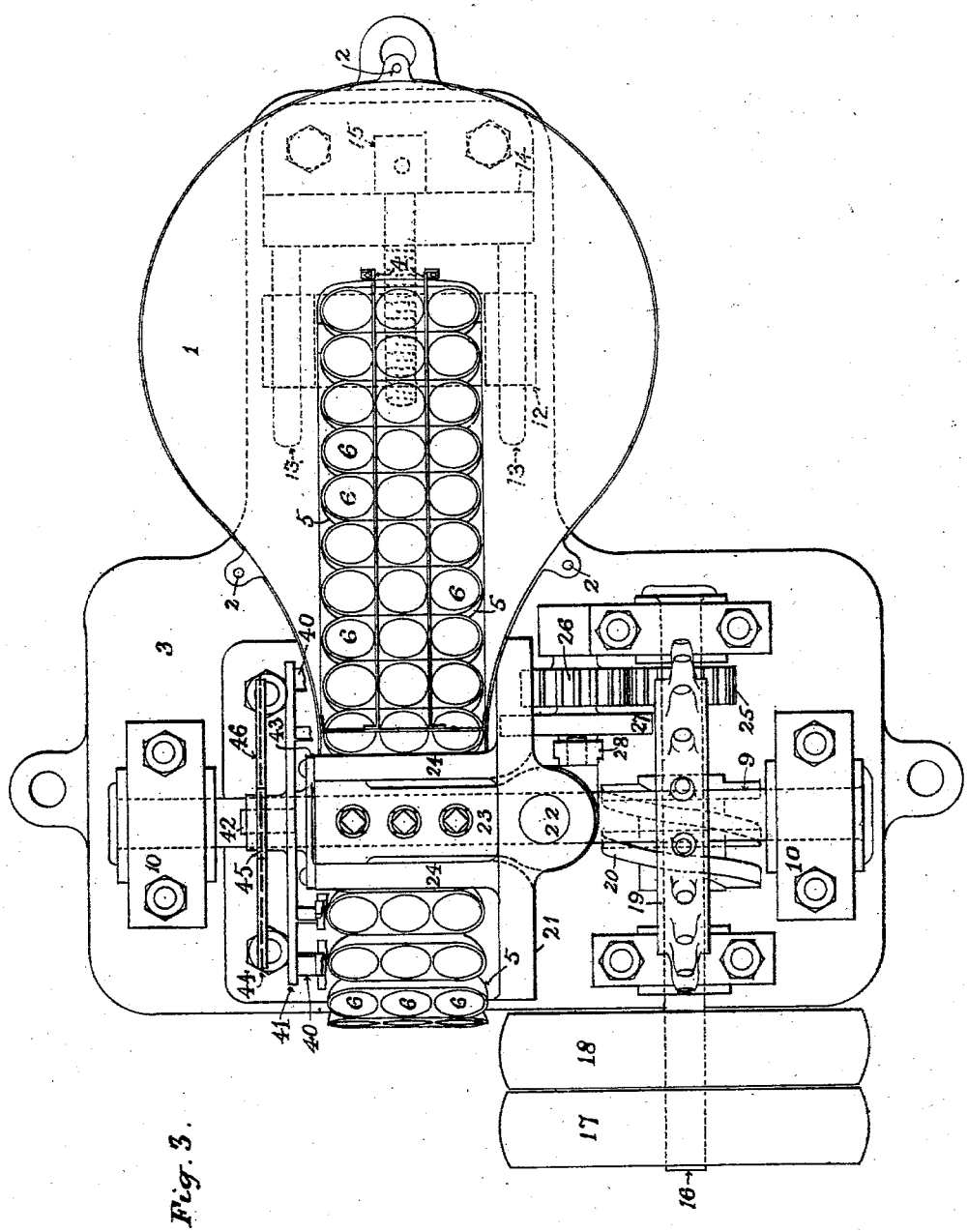
Figure 4:
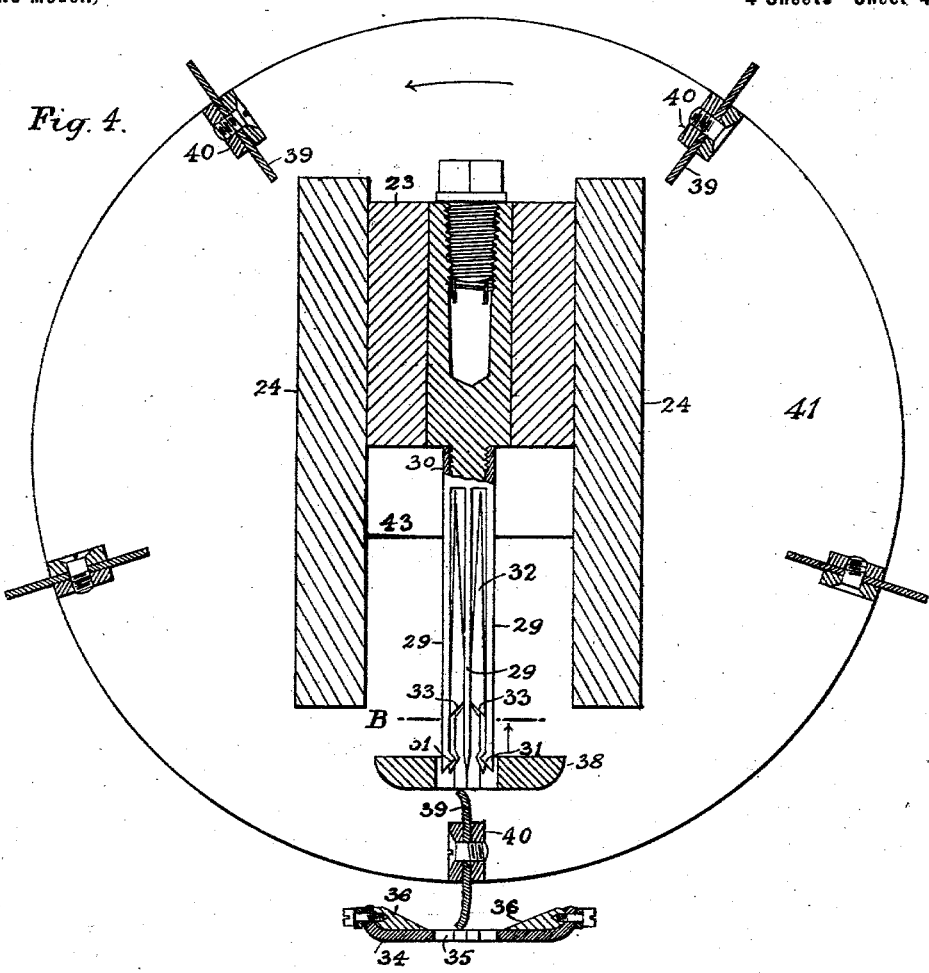
Figure 5:
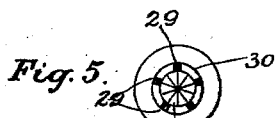
Figure 6:
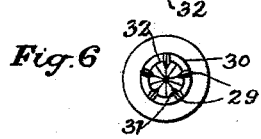
Figure 7:
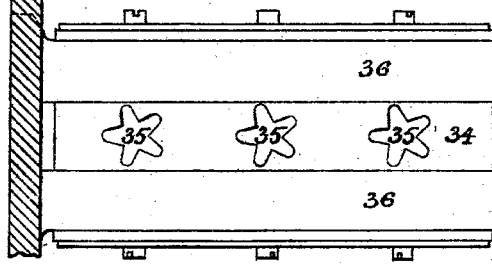

Figure 1 is a side elevation, Fig. 2 an end elevation, and Fig. 3 a plan view, of the entire machine. Fig. 4 represents a section of the portion of the machine on the right hand of the line A, Fig. 2. Fig. 5 represents a transverse section of the stone-extractor on the line B, Fig. 4, looking in the direction of the arrow in that figure; and Fig. 6 is an end view of the acting part of the said extractor. Fig. 7 represents a fragment of one part of the machine, the said figure illustrating a face view of the means for holding the fruit while the extractors are withdrawing the stones. The said Figs. 4, 5, 6, and 7 are drawn to a larger scale than the other figures.

In the following description of the said drawings the parts thereof are referred to by the numerals marked thereon, the same numerals being used to indicate the same parts in all the figures.

1 is the hopper, supported by rods 2 2, fixed in the base 3 of the machine and furnished with bars 4 4 at its outlet part for the purpose hereinafter explained.

The carrier consists of a number of members 5 5, each having formed in it three fruit-receptacles 6 6, the several members being linked together in the form of an endless chain, which is supported by sprocket-wheels 7 8, the wheel 7 being secured to a shaft 9, working in bearings carried by standards 10 10, formed on the base 3, and the wheel 8 being secured to a shaft 11, mounted in uprights formed on a block 12, carried by and free to slide on pins 13 13, projecting from a standard 14, screwed to the base 3, which block 12 is retained in the position necessary for keeping the carrier-chain 5 5 sufficiently in tension by means of a screw 15, passing freely through the hole in the standard 14, the thread of which screw is engaged with a screwed hole in the said block 12 and the head of which screw bears against the outer face of the said standard 14. For the purpose of successively bringing each of the members of the said chain to and holding it stationary at the acting-point—that is, the part of the machine where the stoning operation takes place—the shaft 9 and the main driving-shaft 16, carrying fast and loose pulleys 17 18, are geared together by means of a peg-wheel 19 and a worm 20, the thread of which is shaped as best illustrated in Fig. 3, by reference to which figure it will be seen that one half of each turn of the said worm is helical or inclined to the axis of the shaft 16 and the other half at right angles to the said axis, the result being that during one half of each rotation of the driving-shaft 16 partial rotation is communicated to the sprocket-wheel 7, and during the other half of each rotation of the driving-shaft the said sprocket-wheel is held stationary.

21 is a slotted standard secured to the base 3 and carrying a rod 22, on which is mounted a slide 23, and having projecting wings 24 24, forming guides between which the said slide 23 is capable of vertical reciprocatory motion on the said rod. The stone-extractors (which are hereinafter described and of which there are three) are mounted in the said slide, as plainly illustrated in Fig. 4, and to the said slide reciprocatory motion is communicated as required from the driving-shaft 16 through the medium of gears 25 26, a crank-plate 27, and a connecting-rod 28.

The construction of the stone-extractors will be best understood by reference to Figs. 4, 5, and 6, in which figures an extractor suitable for operating on large cherries is shown of the full size. Each of the said extractors comprises two portions, the one for piercing the fruit and engaging and withdrawing the stone and the other for cutting open the pierced fruit sufficiently to admit of free exit of the stone. The piercing and stone-withdrawing portion consists of a number of pointed spring-tongues 29 29, extending longitudinally from an internally-screw-threaded tube 30 and having projections 31 31 formed on their inner faces near their pointed ends for engaging with the fruit-stone and holding it between them during its withdrawal. The fruit cutting and opening portion consists of a rod 32, of steel or other suitable material, having angular ribs, with radial cutting edges 33 formed at its acting end. The said two portions of the extractor are secured together by engaging the screw-thread within the tube 30 of the piercing portion with an external screw-thread formed at such a point on the cylindrical part of the cutting portion that when the two are engaged together the acting end of the piercing portion will project beyond that of the cutting portion a sufficient distance to insure action of both portions on the fruit, as required, which distance is of course dependent on the size and shape of the fruit to be stoned. In Fig. 4 the acting ends or extremities of the said two portions are shown at a distance apart suitable in the case of cherries about one inch in diameter.

The fruit-retainer or means for holding the fruit while the extractors are withdrawing the stones therefrom consists of a piece of sheet india-rubber 34, (best shown in Fig. 4,) having star-shaped apertures 35 35 formed in it for the stone-extractors to pass through and extended between and secured to arms 36 36, constituting portions of a bracket which is affixed to the standard 21 by screws passing through the part 37, from which the said arms project.

The extractor-clearer or means for disengaging the withdrawn stones from the stone-extractors consists of a plate 38, constituting another portion of the said bracket, which plate has formed in it apertures similar in shape to and coincident with the apertures 35 of the part 34.

The stone-discharger or means for discharging the withdrawn stones from the machine after they have been disengaged from the extractors consists of slips of sheet india-rubber 39 39, secured to arms 40 40, projecting from the face of a rotatory disk 41, mounted on a stud 42, carried by a bar 43, screwed to the wings 24 24 of the standard 21, which disk is geared to the shaft 9 by means of a pitch-chain 44, engaged with chain-wheels 45 46.

The action of the machine is as follows: A quantity of the fruit to be stoned—say cherries—having been placed in the hopper 1 and motion having been communicated to the driving-shaft 16 in the direction indicated by the arrow marked thereon in Fig. 2 through the medium of the fast pulley 17, the carrier is by the action of the worm 20 advanced in the direction of the arrow in Fig. 1 until that one of the members 5 5 of the carrier which is nearest the highest part of the wheel 7 is at the acting-point—that is, in such a position relatively to the extractors that their centers are in line with the centers of the fruit-receptacles of that member. Meanwhile, through the medium of the gearing connecting the driving-shaft with the slide-block 23, the stone-extractors carried by the said block have descended until their acting ends have entered the apertures in the fruit-retainer 34 and through the medium of the connections between the shaft 9 and the stone-discharger that one of the blades of the latter which in Fig. 2 is shown in the lowermost position will have been carried away from the path of motion of the stone-extractors. After this during one-half rotation of the driving-shaft the carrier is held stationary in consequence of that portion of the worm 20 which is at right angles to its axis being in gear with the peg-wheel 19; but the stone-extractors continue descending until their acting ends enter the fruit in the fruit-receptacles at the acting-point and become engaged with the stones, after which the extractors rise until they are clear of the fruit, which is prevented from being carried up with them by bearing against the retainer 34. These motions of the extractors produce removal of the stones from the fruit in those receptacles of the carrier which are at the acting-point, the descent of each of the extractors causing its spring-tongues 29 29 to pierce and enter one of the fruit and to embrace the stone, the said tongues being sprung outward by contact of their projections 31 31 with the stone while passing it and returning to their normal position after the said projections have passed the stone, which is then held between the said projections and the cutting edges 33 33 of the rod 32, which cutting edges while the piercing portion of the extractor is acting, as described, lay open the skin and pulp of the fruit sufficiently to permit of free exit of the stone on the ascent of the extractor. After the extractors have passed the retainer 34 the helical portion of the worm 20 again comes into action, causing motion of the carrier, by which the member containing fruit which has been stoned by the action of the extractors is carried away from the acting-point, and the next member conveying unstoned fruit from the hopper is advanced toward that point while the extractors continue ascending, the stones being disengaged from them by the points around the apertures of the clearer 38 during the retiring motion of the extractors through it, and the said stones being by the action of the discharger removed from the surface of the retainer 34, on which they fall when cleared from the extractors. Thus at each rotation of the driving-shaft the stones are automatically removed from three of the fruit with which the hopper has been charged, and the stones removed are automatically discharged from the machine.

The bars 4 4 in the hopper serve to prevent the fruit passing from it from lodging on the carrier between the receptacles 6 6.

Where the machine is to be used for stoning large fruit, such as plums, they should be placed by hand in the receptacles of the carrier, the hopper being dispensed with.

What I claim as my invention of "improvements in machines for removing the stones from cherries and other single-stoned fruit," and desire to secure by Letters Patent, is—

1. The combination of a reciprocatory stone-extractor for entering and withdrawing the stone from the fruit and an extractor-clearer for freeing the withdrawn stone from the extractor.

2. The combination of a reciprocatory stone-extractor for withdrawing the stone and a fruit-retainer for the fruit to bear against during withdrawal of the stone therefrom and an extractor-clearer for freeing the withdrawn stone from the extractor.

3. The combination of a reciprocatory stone-extractor for withdrawing the stone and a fruit-retainer for the fruit to bear against during withdrawal of the stone therefrom and an extractor-clearer for freeing the withdrawn stone from the extractor and a rotary stone-discharger for removing the freed stone from the machine.

4. A reciprocatory stone-extractor provided with sharp edges partially for entering and cutting open the skin and pulp of the fruit at one side of the stone and partially for engaging with and withdrawing the stone through the opening cut.

5. A reciprocatory stone-extractor comprising spring-tongues for piercing the fruit and embracing the stone therein and projections on the said tongues for retaining the stone in the embrace of the extractor.

6. A reciprocatory stone-extractor comprising spring-tongues for piercing the fruit and embracing the stone therein and projections on the said tongues for retaining the stone in the embrace of the extractor and blades for cutting open the skin and pulp of the fruit between the spring-tongues and the stone to permit of exit of the stone with the extractor on withdrawal of the latter from the fruit.

7. An extractor-clearer for freeing withdrawn stones carried by a reciprocating stone-extractor such clearer consisting of a plate situated in the path of motion of the stone-extractor.

8. In a machine of the character described, the combination of a reciprocatory stone-extractor for partially entering and withdrawing the stone from the fruit, a conveyer for feeding the fruit to the extractor, a pair of sprocket-wheels for supporting the conveyer, said wheels of different diameters, a shaft for operating the sprocket-wheel of larger diameter, a peg-wheel for operating said shaft, means engaging with the said peg-wheel for intermittently operating it, means for operating the stone-extractor, and an extractor-clearer for freeing the withdrawn stone from the extractor.

9. In a machine of the character described, a reciprocatory stone-extractor comprising spring-tongues for piercing the fruit and embracing the stone therein and projections on the said tongues for retaining the stone in the embrace of the extractor, and an extractor-clearer for freeing the withdrawn stones from the extractor.

10. In a machine of the character described, a reciprocatory stone-extractor comprising spring-tongues for piercing the fruit and embracing the stone therein and projections on the said tongues for retaining the stone in the embrace of the extractor, an extractor-clearer for freeing the withdrawn stones from the extractor, and a rotary stone-discharger for removing the freed stone.

11. A reciprocatory stone-extractor comprising spring-tongues for piercing the fruit and embracing the stone therein and projections on the said tongues for retaining the stone in the embrace of the extractor and blades for cutting open the skin and pulp of the fruit between the spring-tongues and the stone to permit of exit of the stone with the extractor on withdrawal of the latter from the fruit, and an extractor-clearer for freeing the withdrawn stones from the extractor.

12. A reciprocatory stone-extractor comprising spring-tongues for piercing the fruit and embracing the stone therein and projections on the said tongues for retaining the stone in the embrace of the extractor and blades for cutting open the skin and pulp of the fruit between the spring-tongues and the stone to permit of exit of the stone with the extractor on withdrawal of the latter from the fruit, an extractor-clearer for freeing the withdrawn stones from the extractor, and a rotary stone-discharger for removing the freed stone.

13. In a machine of the character described, a standard, a rod carried thereby, a slide mounted upon the rod, guides for the said slide, means for imparting a vertical reciprocatory motion to said slide, a stone-extractor carried by the said slide and adapted to partially enter and withdraw the stone from the fruit, means for feeding the fruit to be stoned to the said extractor, and an extractor-clearer for freeing the withdrawn stone from the extractor.

14. In a machine of the character described, a standard, a rod carried thereby, a slide mounted upon the rod, guides for the said slide, means for imparting a vertical reciprocatory motion to said slide, a stone-extractor carried by the said slide and adapted to partially enter and withdraw the stone from the fruit, means for feeding the fruit to be stoned to the said extractor, an extractor-clearer for freeing the withdrawn stone from the extractor, and a rotary stone-discharger for removing a freed stone from the machine.

In testimony whereof I have signed my name to this specification in the presence of two subscribing witnesses.

WILLIAM PERCY HARRIS. [L. S.]

Witnesses:
WILLIAM THOMAS WHITEMAN,
PERCY CHARLES RUSHEN.